United States Patent [19]

Müntnich et al.

[11] Patent Number: 5,178,474
[45] Date of Patent: Jan. 12, 1993

[54] SPLIT CAGE FOR ROLLING ELEMENTS

[75] Inventors: Leo Müntnich, Aurachtal; Hartwig Waldert, Adelsdorf; Wolgang Steinberger, Herzogenaurach, all of Fed. Rep. of Germany

[73] Assignee: Ina Walzlager Schaeffler KG, Fed. Rep. of Germany

[21] Appl. No.: 795,427

[22] Filed: Nov. 20, 1991

[30] Foreign Application Priority Data

Dec. 1, 1990 [DE] Fed. Rep. of Germany ....... 4038444

[51] Int. Cl.⁵ ............................................. F16C 33/46
[52] U.S. Cl. .................................... 384/577; 384/572
[58] Field of Search .............. 384/523, 526, 572, 573, 384/576, 577, 578, 579

[56] References Cited

U.S. PATENT DOCUMENTS 2,644,730  7/1953  Levine .................................. 384/577
3,399,008  8/1968  Farrell et al. ....................... 384/577
4,235,487 11/1980  Schard ................................. 384/576
4,239,304 12/1980  Wakunami ........................... 384/573
4,397,507  8/1983  Kraus et al. ...................... 384/577 X
4,472,007  9/1984  De Vito .............................. 384/572
5,033,876  7/1991  Kraus ................................. 384/577
5,044,787  9/1991  Hupfer et al. ................... 384/576 X Primary Examiner—Thomas R. Hannon
Attorney, Agent, or Firm—Bierman and Muserlian

[57] ABSTRACT

A rolling element cage made particularly of polymeric material in which rolling elements are guided in pockets and which is split at at least one point of its periphery, the cage ends delimiting the separating gap being formed by crossbars which comprise projections and corresponding recesses which fix these cage ends at least in the axial direction by interlocking, characterized in that the recesses in the crossbar forming the respective cage end extend into the adjacent pocket and, when the separating gap is closed, the projections projecting into the recesses extend at the most upto the delimiting surface of the pocket facing the cage end.

6 Claims, 3 Drawing Sheets

SPLIT CAGE FOR ROLLING ELEMENTS

STATE OF THE ART

Rolling element cages made of polymeric material in which rolling elements are guided in pockets and which is split at at least one point of its periphery, the cage ends delimiting the separating gap being formed by crossbars which comprise projections and corresponding recesses which fix these cage ends at least in the axial direction by interlocking are known. Such split rolling element cages in which a so-called lock mounted on the cage ends fixes them at least in the axial direction are known for example from EP-PS 0,016,880. In this variant, the projections and recesses in the cage ends are designed so that these cage ends are fixed in the axial as well as in the radial direction by interlocking but are movable relative to each other in the peripheral direction. As far as their function is concerned, these types of cage locks do indeed serve their purpose.

A disadvantage, however, seems to be the large space requirement of these cage locks. The design space of the cage lock detracts from the number of rolling elements that can be accommodated in the cage so that the bearing capacity of such split cage/rolling element assemblies is lower than that of unsplit assemblies.

OBJECTS OF THE INVENTION

It is an object of the invention to provide a split cage for rolling elements in which the design space requirement of the lock is reduced to a minimum and in which an optimum number of rolling elements can be accommodated in the cage.

This and other objects and advantages of the invention will become obvious from the following detailed description.

THE INVENTION

This object is achieved according to the invention in that the recesses in the crossbar forming the respective cage end extend into the adjacent pocket, and, when the separating gap is closed, the projections extend at the most upto the delimiting surface of the pocket facing the cage end. By the construction of the invention, it is achieved that the so-called cage lock is completely integrated into the crossbar forming the respective cage end so that the space requirement of the cage lock in the peripheral direction is approximately only double that of an individual crossbar in the rest of the cage. The number of rolling elements that can be accommodated in the cage is therefore hardly prejudiced by the lock construction of the invention. The width of the crossbar is utilized to assure the guidance of the lock in the peripheral direction.

A particularly advantgeous embodiment of the invention provides, especially in the case of multi-row rolling element cages, that several projections and recesses be arranged alternately in the axial direction on the cage ends. For fixing the cage ends in the peripheral direction, it is possible to additionally provide mutually corresponding lugs in the region of these projections and recesses so that the cage ends can execute a limited movement in the peripheral direction before the lugs hook into each other.

In another embodiment, guiding surfaces corresponding to each other are arranged in the peripheral direction in the region of the projections and recesses and fix the cage ends in the radial direction. A further variant of the invention, in which the cage ends are fixed in both axial and in both radial directions by interlocking and can only execute a limited movement in the peripheral direction, is obtained if mutually corresponding lugs as well as guiding surfaces are provided.

With a view to assembly by robots, it appears to be appropriate to fix the cage ends of split cages relative to each other in all spatial directions before assembly. This is accomplished by the invention by the fact that brittle joints are provided between the cage ends in the region of the projections and recesses while the separating gap is still open, which brittle joints form a location of intended fracture and can easily be broken open during the assembly of the cage by closing the separating gap. It is particularly advantageous to arrange the joint location between the contiguous edges of two projections.

Referring now to the drawings.

Figure 1:
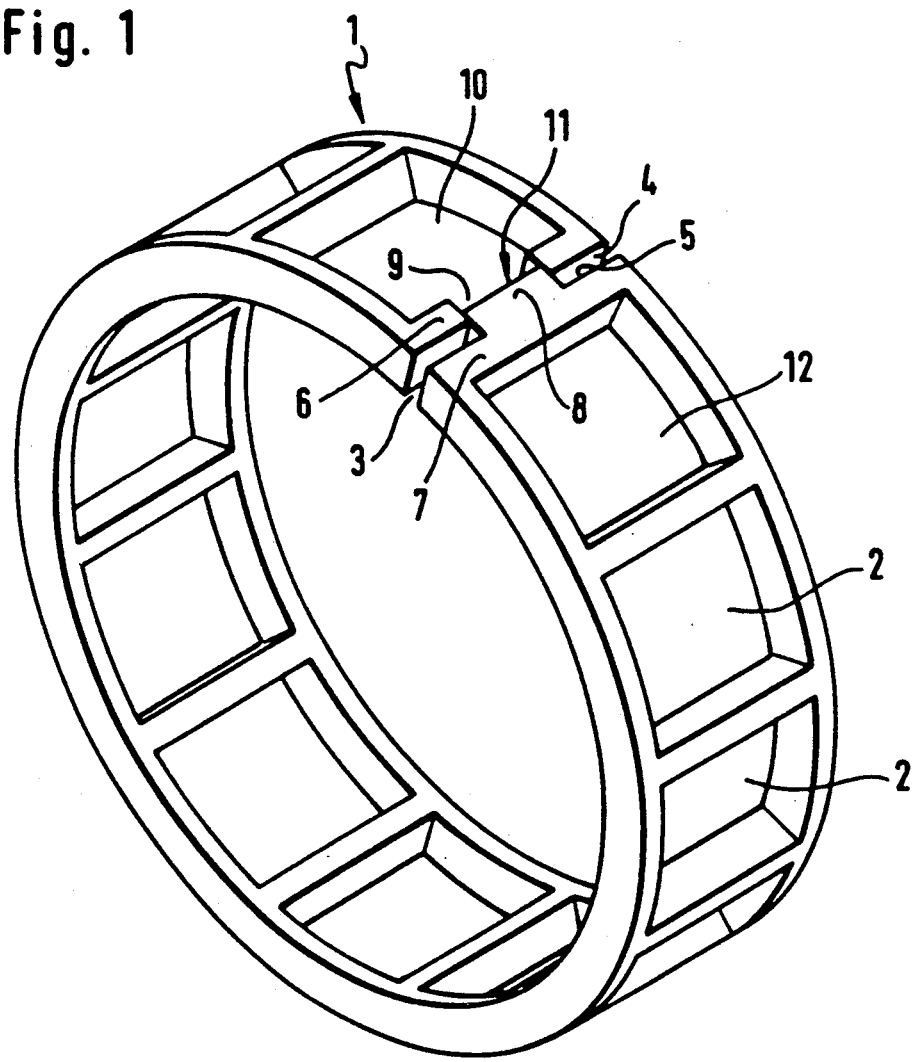
FIG. 1 is a perspective view of a rolling element cage of the invention.

FIG. 1 is a perspective representation of a rolling element cage 1 which comprises pockets 2 for rolling elements and which is split at one point of its periphery, the cage ends 4, 5 delimiting the separating gap 3 being formed by crossbars 6, 7 on which projections 8 and corresponding recesses 9 are provided which cooperate with each other so that the cage ends 4, 5 are fixed relative to each other in the axial direction. The recess 9, which is actually a break-through, extends from the cage end 4 to the adjacent pocket 10 so that the crossbar 6 forming the cage end 4 is completely integrated into the so-called cage lock 11. Thus, the distance in the peripheral direction between the respective pockets 10, 12 adjoining the cage ends corresponds to approximately only double the width of a crossbar between any two pockets 2 in the rest of the cage 1, whereby it is achieved that an optimum number of rolling elements can be accommodated in the cage 1.

Figure 2:
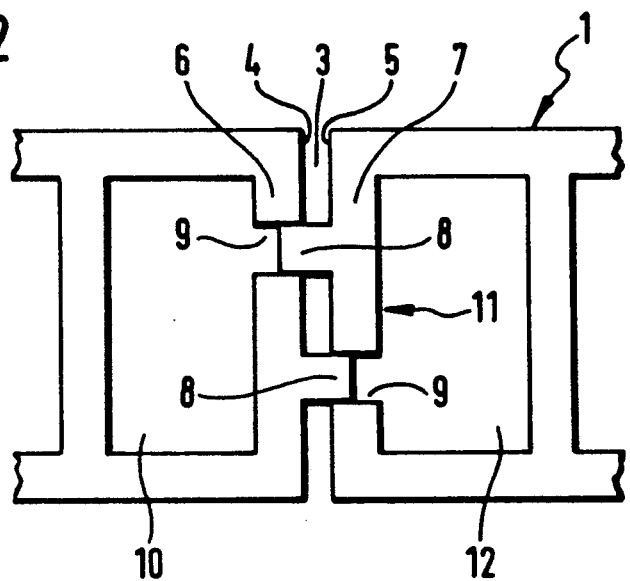
FIGS. 2 to 4 are partial top views of a rolling element cage of the invention.

FIG. 2 shows a partial top view of a rolling element cage 1 in the region of the separating gap 3 and the cage lock 11. In this embodiment, projections 8 and recesses 9 are arranged alternately in the axial direction on the crossbars 6, 7. In FIG. 3 again, only the cage section comprising the separating gap 3 is shown, the projections 8 with the corresponding recesses 9 being arranged so that mutually corresponding lugs 13, 14 can be provided in their region, which lugs permits a limited movement of the cage ends 4, 5 in the peripheral direction before hooking into each other.

Figure 3:
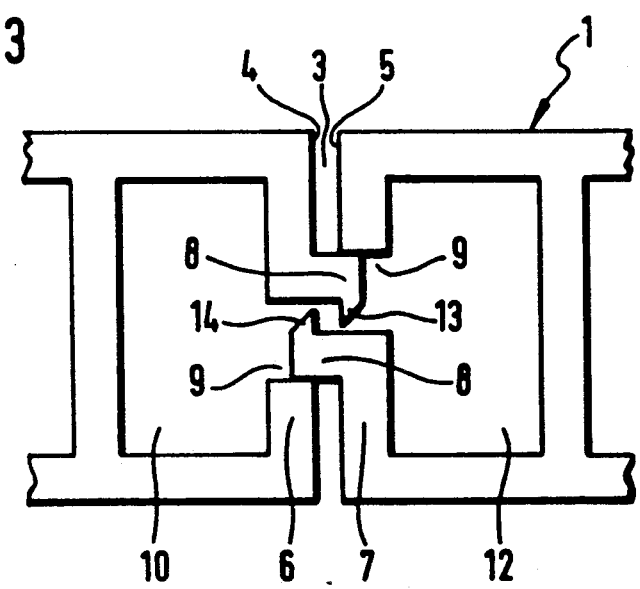
Figure 4:
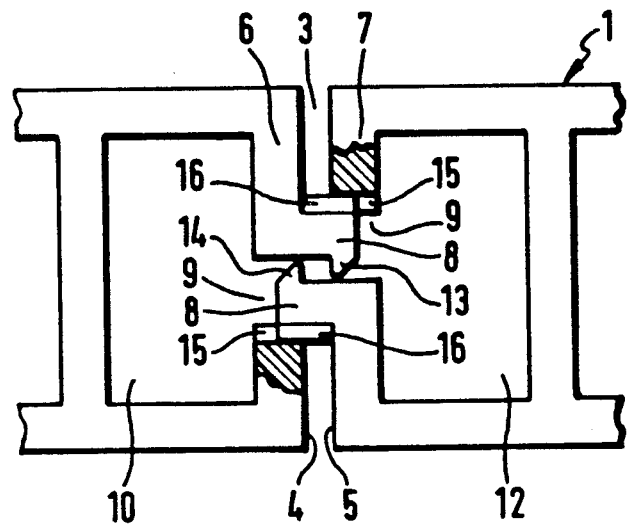
Figure 5:
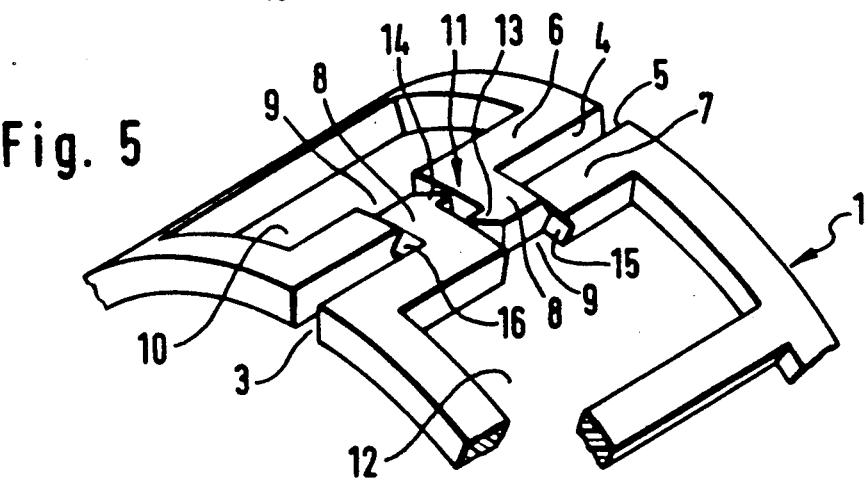
FIG. 5 is a partial perspective view of the rolling element cage of FIG. 4.

FIG. 4 shows a development of FIG. 3 in which guiding surfaces 15, 16 are provided on the projections 8 and the recesses 9 and fix the cage ends relative to each other in the radial direction whereas at the same time corresponding lugs 13, 14 provided on the sides of the projections 8 facing away from the guiding surfaces 15, 16 permit a limited movement of the cage ends 4, 5 in the peripheral direction before hooking into each other. To make this more clear, the embodiment of FIG. 4 is represented once more in perspective in FIG. 5.

Figure 6:
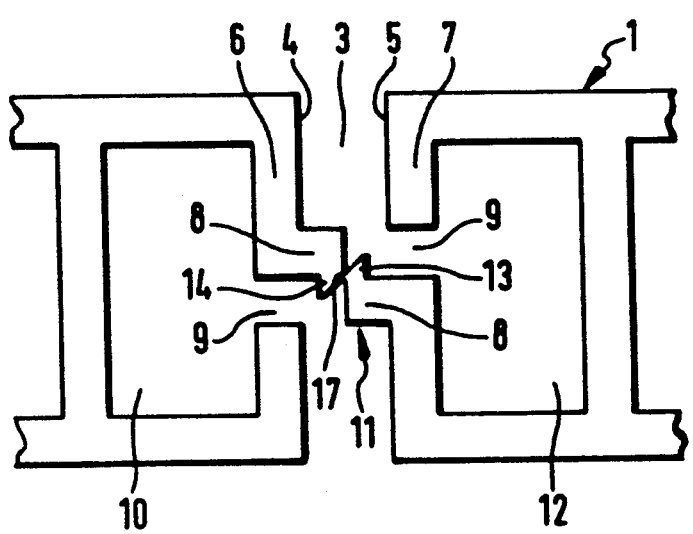
FIG. 6 is a partial top view of a rolling element cage of the invention comprising a joint location.

FIG. 6 shows a version of the cage which is suitable in particular for assembly by robots. Before assembly and with the separating gap 3 open, the projections 8 are joined to each other at their contiguous edges by a brittle joint which forms a location of intended fracture. During assembly, the separating gap 3 is closed by the gripper of the robot which results in the brittle joint 17 breaking open and assures the movability of the cage ends 4, 5 in the peripheral direction. Further constructional variants other than these examples of embodiment are conceivable in which the cage lock is integrated into the crossbars of the pockets adjoining the cage ends.

Various modifications of the cage of the invention may be made without departing from the spirit or scope thereof and it should be understood that the invention is intended to be limited only as defined in the appended claims.

We claim:

1. A rolling element cage made particularly of polymeric material in which rolling elements are guided in pockets and which is split at at least one point of its periphery, the cage ends delimiting the separating gap being formed by crossbars which comprises projections and corresponding recesses arranged alternately in the axial direction on the crossbars which form the cage ends which fix these cage ends at least in the axial direction by interlocking, characterized in that the recesses in the crossbar forming the repective cage and extend into the adjacent pocket and, when the separating gap is closed, the projections projecting into the recesses extend at the most up to the delimiting surface of the pocket facing the cage end.

2. A rolling element cage of claim 1 wherein mutually corresponding lugs are arranged on the projections and in the recesses, which prevent a movement of the cage ends in the peripheral direction after a limited displacement.

3. A rolling element cage of claim 1 wherein guiding surfaces corresponding to each other are provided on the projections and recesses, which guiding surfaces fix the cage ends in both radial directions.

4. A rolling element cage of claim 1 wherein brittle joint locations are provided between the cage ends in the region of the projections and recesses while the separating gap is still open, which joint locations form a location of intended fracture.

5. A rolling element cage of claim 4 wherein the brittle joint locations are arranged between the front edges of the projections facing the respective other cage end.

6. A rolling element cage of claim 5 wherein the brittle joint locations are arranged in the region of the lugs.

* * * * *